United States Patent Office.

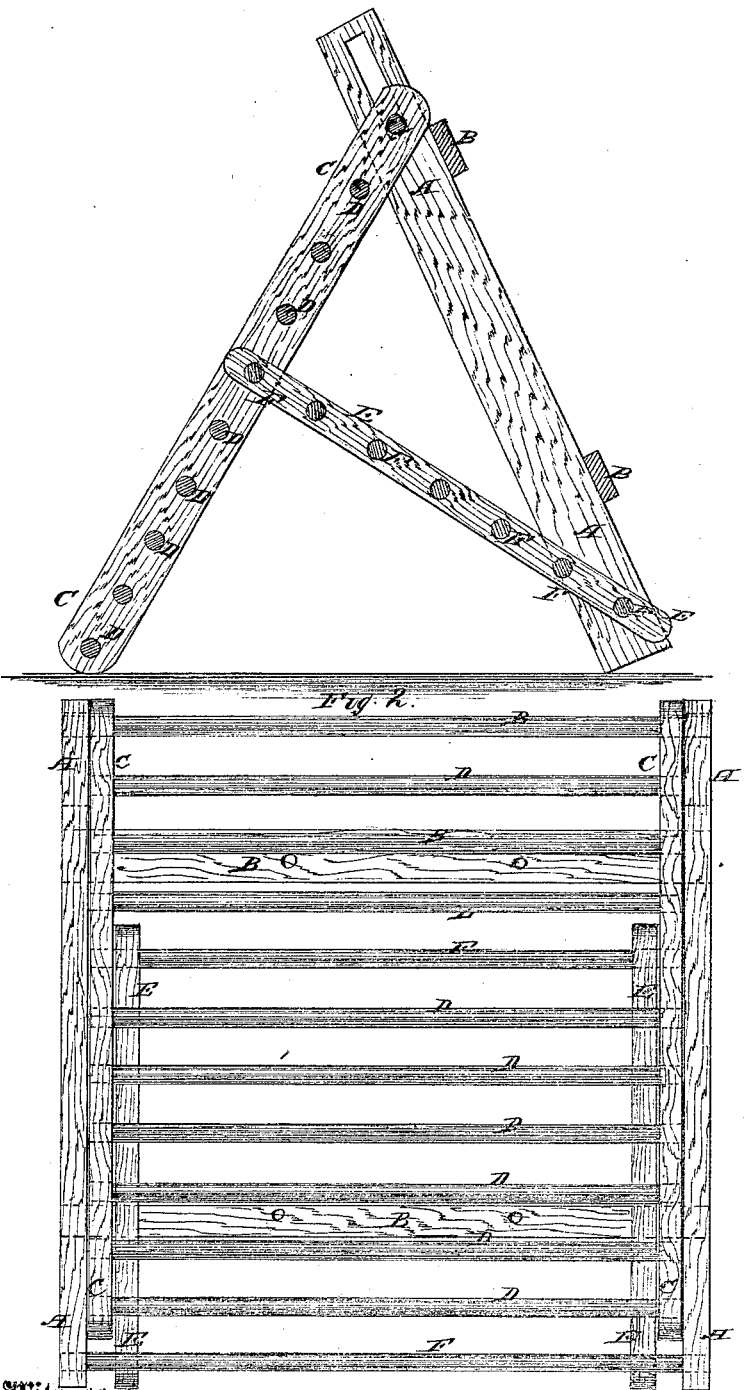

THOMAS H. CHUBB AND WILLIAM G. MARSTON, OF POST MILLS, VERMONT.

Letters Patent No. 114,527, dated May 9, 1871.

IMPROVEMENT IN CLOTHES-DRIERS.

The Schedule referred to in these Letters Patent and making part of the same.

*To all whom it may concern:*

Be it known that we, THOMAS H. CHUBB and WILLIAM G. MARSTON, of Post Mills, in the county of Orange and State of Vermont, have invented a new and useful Improvement in Clothes-Drier; and we do hereby declare that the following is a full, clear, and exact description thereof, which will enable others skilled in the art to make and use the same, reference being had to the accompanying drawing forming part of this specification, in which—

Figure 1 is a vertical cross-section of our improved clothes-drier opened out.

Figure 2 is a front view of the same closed up.

Similar letters of reference indicate corresponding parts.

Our invention has for its object to furnish an improved clothes-drier and towel-rack which shall be simple in construction and convenient in use, and which, when opened out, will furnish a large amount of drying surface, and when closed up will occupy but little space; and It consists in the construction and arrangement of the various parts of the drier, as hereinafter more fully described.

A are the two side bars of the main frame, which are connected and held in their proper position by the cross-bars B.

The larger drying-frame consists of the sids bars C, which are connected and held in their proper relative positions by the rounds D.

The drying-frame C D is made of such a size as to fit between the side bars A of the main frame A B, as shown in fig. 2.

The ends of the upper round D of the drying-frame C D project so as to enter and work in longitudinal slots in the upper part of the side bars A of the frame A B.

The smaller drying-frame consists of the two side bars E, connected and held in their proper relative position by the rounds F.

The drying-frame E F is made of such a size as to fit between the side bars C of the larger drying-frame C D.

The ends of the upper round F of the frame E F project so as to pass through and work in holes in the side bars C of the larger drying-frame C D, so as to pivot the upper end of the drying-frame E F to the middle part of the side bars of the drying-frame C D, the upper round of the frame E F being thus common to the two drying-frames.

The ends of the lower round F of the drying-frame E F project so as to pass through holes in the lower part of the side bars A of the frame A B.

When in use the clothes-drier may stand upon the lower ends of the side bars A and C of the frames A B and C D, as shown in fig. 1; or it may be detachably or permanently suspended from a wall or other support by means of nails, spikes, or screws passing through holes in the cross-bars B of the frame A B.

When not in use the clothes-drier may be closed or shut up, as shown in fig. 2, so as to occupy no more space than the frame A B.

Having thus described our invention,

We claim as new and desire to secure by Letters Patent—

An improved clothes-drier or towel-rack, consisting of the main frame A B, the larger drying-frame C D, and the smaller drying-frame E F, said parts being constructed and arranged substantially as herein shown and described and for the purposes set forth.

THO. H. CHUBB.
W. G. MARSTON.

Witnesses:
H. H. NILES,
G. W. COMSTOCK.